(12) United States Patent
Kansal

(10) Patent No.: US 6,871,181 B2
(45) Date of Patent: Mar. 22, 2005

(54) SYSTEM AND METHOD OF ASSESSING AND RATING VENDOR RISK AND PRICING OF TECHNOLOGY DELIVERY INSURANCE

(76) Inventor: Namita Kansal, 284 Fifth Ave., Apt. 7f, New York, NY (US) 10001

(*) Notice: Subject to any disclaimer, the term of this patent is extended or adjusted under 35 U.S.C. 154(b) by 75 days.

(21) Appl. No.: 10/454,707

(22) Filed: Jun. 5, 2003

(65) Prior Publication Data

US 2003/0182213 A1 Sep. 25, 2003

Related U.S. Application Data

(63) Continuation-in-part of application No. 09/930,140, filed on Aug. 16, 2001, now Pat. No. 6,647,374.
(60) Provisional application No. 60/227,513, filed on Aug. 24, 2000, and provisional application No. 60/290,069, filed on May 11, 2001.

(51) Int. Cl.$^7$ .............................................. G06F 17/60
(52) U.S. Cl. .............................. 705/4; 705/37; 705/26; 705/400
(58) Field of Search ............................ 705/37, 4, 400, 705/26

(56) References Cited

U.S. PATENT DOCUMENTS

| | | | |
|---|---|---|---|
| 5,704,045 A | | 12/1997 | King et al. |
| 5,734,890 A | | 3/1998 | Case et al. |
| 5,748,973 A | | 5/1998 | Palmer et al. |
| 5,765,138 A | | 6/1998 | Aycock et al. |
| 5,890,138 A | | 3/1999 | Godin et al. |
| 5,918,219 A | | 6/1999 | Isherwood |
| 5,930,760 A | * | 7/1999 | Anderton et al. ............... 705/4 |
| 5,970,479 A | | 10/1999 | Shepherd |
| 6,018,714 A | * | 1/2000 | Risen et al. ................... 705/4 |
| 6,088,678 A | | 7/2000 | Shannon |
| 6,092,050 A | | 7/2000 | Lungren et al. |
| 6,195,646 B1 | | 2/2001 | Grosh et al. |
| 6,219,654 B1 | | 4/2001 | Ruffin |
| 6,647,374 B2 | * | 11/2003 | Kansal ......................... 705/37 |
| 2002/0062231 A1 | * | 5/2002 | Zaccaria et al. ............... 705/4 |
| 2002/0095317 A1 | * | 7/2002 | McCabe ........................ 705/4 |

FOREIGN PATENT DOCUMENTS

| | | | | |
|---|---|---|---|---|
| EP | WO89/12865 | * | 12/1989 | ........... G06F/15/21 |

OTHER PUBLICATIONS

Irwin et al, "Managing government exposure to private infrastructure risks", The World Bank Research Observer, dated Aug. 1999.*

* cited by examiner

*Primary Examiner*—Jeffrey A. Smith
*Assistant Examiner*—Mark Fadok
(74) *Attorney, Agent, or Firm*—Hoffman, Wasson & Gitler, P.C.

(57) ABSTRACT

A method and system for providing a standardization and commoditizing the process of technology contracts and creating method for assessing, scoring, ranking and rating technology vendors for the purpose of comparing vendor bids on a project and for structuring and pricing insurance/surety contracts. Intrinsic and two-way vendor ratings are established for each of the vendors in a particular project. This two-way rating is used to provide a risk adjustment to the nominal bid of each of the vendors. The two-way rating is also utilized to structure and calculate an insurance premium based upon the probability that the vendor would fail/default on the delivery of a technology project.

13 Claims, 7 Drawing Sheets

SYSTEM AND METHOD OF ASSESSING AND RATING VENDOR RISK AND PRICING OF TECHNOLOGY DELIVERY INSURANCE

CROSS-REFERENCE APPLICATIONS

The present invention claims the benefit of U.S. Provisional Patent Application 60/227,513, filed on Aug. 24, 2000, and 60/290,069, filed May 11, 2001 and continuation-in-part to U.S. patent application Ser. No. 09/930,140, filed Aug. 16, 2001, now U.S. Pat. 6,647,374.

FIELD OF THE INVENTION

The present invention is directed to a method and apparatus for the commoditization of service contracts allowing various vendors to be ranked based upon their intrinsic strength (intrinsic rating) and on their ability to deliver on a specific project (Two-Way Rating). The present invention is also directed to a method and system for pricing technology delivery insurance based upon the failure/default by a vendor. This assessment and ranking will allow insurance companies to structure and underwrite insurance/surety contacts, by allowing insurance companies to assess the comparative risk inherent in specific vendors hence giving the insurance company/guarantor the ability to price risk based premiums or fees and the ability to underwrite and monitor vendor performance.

BACKGROUND OF THE PRESENT INVENTION

Historically, if a particular customer wished to have a vendor to provide a particular product for the customer, such as erecting a particular structure, the customer would publicize this fact to the appropriate industry along with various parameters required for the vendors to prepare a proposal for erecting the structure. The customer would then review the proposals received from the vendors for the purpose of choosing the particular vendor to which a contract is awarded for erecting the structure. Generally the choice of the vendor will be based upon the total cost of the project, the time it would take to complete the project, as well as various other factors, such as the reliability of the particular vendor. As can be appreciated, at least partly basing the awarding of a large contract on the perceived reliability and trustworthiness of the vendor could result in a non-timely completion of the project as well as the project being delivered over the agreed upon cost if the perceived reputation of the vendor was unwarranted.

Additionally, along with the subjective nature of the decision to reward a contract, the contract process itself was rather time consuming. Once a customer decided to embark upon a particular project, various vendors must be alerted to the existence of such a project which typically occurred by the customer mailing the request for proposals (RFPs) to various potential vendors or publishing the request for proposals in industry publications. As can be appreciated, recent advances in technology have resulted in lessening the communication time between a customer and a potential vendor by the utilization of the Internet. Although the current invention does not depend on the Internet for its success.

Additionally, an auction concept has permeated corporate thinking to the degree that most sectors are now attempting to turn their buying or selling decisions into a bidding exercise where buyers and sellers either are aggregated into a virtually monopsony (single buyer) or monopoly (single seller). Although the reverse auction concept would work well for generic products and commodities, it is yet to be applied to the burgeoning technology industry which includes software development contracts.

To consider a reverse auction in any field, it is necessary to commoditize the service contracts and apply objective standards to analyze the pool of bidders. Once standards have been applied to neutralize the impact of extraneous variables, the normal interplay of supply and demand will yield price discovery. However, while it is relatively easy to make a well known substance such as wheat or corn into a commodity, the commoditization of a less quantifiable concept such as technology services becomes problematic. The present invention describes a formula and business model that makes this possible. Generally, once the various proposals are received by the customer from the vendors, the contract is awarded to the vendor whose total cost is the lowest or who can provide the product most quickly, or both. While on the surface, it would appear that it would be obvious to award the contract based upon the cost or time of delivery. However, this yardstick would not take into account the performance of the vendor. Rather, it is important to determine whether the vendor can perform the contract in the time period required or for the agreed upon cost. Therefore, it is important to be able to rank the reliability of the vendors and factor this reliability into the time of performance and the cost of the project to better compare the vendors. This will provide to the client both a nominal bid and a risk-adjusted bid (which includes the component of performance strength and delivery within it). Ability to rate performance itself is derived from the analysis of vendor capabilities using the intrinsic and the two-way rating process at the heart of this invention. Furthermore, with respect to rather complex contracts a better comparison can be made if the contracts are partitioned into various independent modules/phases for the purpose of comparing the bids, abilities and the risk inherent in specific vendors. The understanding of the risk inherent in various components of the contract will allow the insurance company/guarantor to underwrite technology risk, which is the ability of the vendor to deliver on the technology that he is contracted to deliver.

Various prior art patents address several aspects of the prior art. For example, U.S. Pat. No. 6,088,678, issued to Shannon, describes a process simulation technique using benefit-trade matrices to estimate schedule, costs and risks. As illustrated in FIGS. 2 and 3, a process simulation tool is utilized employing benefit-trade matrices 21a–21f and various steps during a design process. The benefit-trade matrix comprises a multiple variable look up table embodying history data relating to a particular step indicative of weights of schedule, cost and risk elements as well as user-input rating data. As described in column 7, lines 5–20, if a risk metric is scored high, the user may decide to forego simulation and take the risk that a mistake was not made, or make the appropriate trade off if a mistake was made. However, while it is clear that the patent to Shannon does take into account risk, the purpose of this accountability is to determine whether a simulation is cost effective. There is no suggestion that this risk be applied to various vendors. Indeed, it would appear that this patent is directed to a technique in which a schedule is determined by a single vendor used to calculate resources required to complete a particular project. There is no implication of an insurance structure within this.

U.S. Pat. No. 6,195,646, issued to Grosh et al shows a system and method for facilitating the valuation and purchase of information. This patent acknowledges that at present, few techniques exist for the determination of what to charge for any particular data. As indicated in column 2, lines 1–10, the patent to Grosh et al is directed to facilitating the upcoming commoditization of information. Therefore, while the patent to Grosh et al does recognize an impending trend in the industry, it does not address the manner in which this trend is to be utilized to obtain data relating to various contracts to be awarded.

U.S. Pat. No. 5,734,890, issued to Case et al, illustrates a system and method for analyzing procurement decisions and customer satisfaction. Although this patent acknowledges that the vendor's qualifications are important in making procurement decisions, it does not provide a clear indication of relatively ranking these vendors based upon the time of performance and cost of a particular project as well as partitioning the product when making this determination (or of structuring an insurance contract from this).

U.S. Pat. No. 5,765,138, issued to Aycock et al, relates to an apparatus and method for providing interactive evaluation of potential vendors. Vendor requirements are selected for vendor qualification and these vendor requirements can be assigned a relative weight on the basis of project objectives. A selected group of requirements defining quality control standards are supplied in an RFP/RFQ as objective criteria to be met with a desired vendor in a project. Upon receiving the responses, each response is provided with a scaled score. By correlating the scaled score with the relative weight of each of the requirements with respect to the project objectives, the patent to Aycock et al enables an objective evaluation of the supply responses in order to determine a supplier maturity level. It is important to note that the analysis described in Aycock et al is based primarily upon responses received by the particular vendors. Additionally, this patent does not describe a system in which the contracts are partitioned to better compare the vendors during the selection process, allowing an insurance company/guarantor to underwrite the technology risk. Also, this patent does not address the vendors ability to deliver on a "specific contract".

None of the patents described hereinabove anticipates or suggests a method or system in which vendors are rated on their generalized past performance as well as specific past performers relating to the type of technology forming the subject of the contract bid. This rating system would be normalized in a manner in which all of the vendors bidding on the contract constitute the entire universe of bids for that contract. This rating system would be used to provide a good measure to compare nominal bids of the contract by providing the risk-adjusted bid of the vendor in addition to the nominal bid. The rating system would be used to determine an insurance premium insuring the customer against default for non-timely performance of the contract.

SUMMARY OF THE INVENTION

The deficiencies of the prior art are addressed by the present invention which is directed to a method and system for partitioning contracts into various independent modules/phases, allowing the complexity of each module/phase to be determined as well as utilizing these individual modules/phases in the assessment of a particular vendor's capability of delivering the entire contract in a timely manner as well as determining the ultimate cost of the project. This creates a structure allowing the insurance company/guarantor for the first time to underwrite risk inherent technology contracts and price a risk-neutral premium associated with this risk, that is, the relative ranking of vendors based upon their ability to deliver and the relative risk inherent in a particular vendor. The distinguishing aspect in determining value, as opposed to price, is to objectively quantify the relative risks associated with using individual vendors. This is because second-tier vendors will be usually less expensive than first-tier vendors, but the risk is greater. Choosing the lowest bidder could turn out to be a mistake. Therefore, the risk-adjustment applied to the nominal bid submitted by a vendor is the key to accurately assessing the risk in a particular vendor. The system and method according to the present invention can restore parity between bids and compare them on a uniform scale familiar to commodities markets.

A score or ranking is developed for each of the vendors based upon the vendor's historical reliability as well as normalizing the vendor's ranking with respect to the other vendors for the purpose of determining the appropriate vendor. This is known as the intrinsic rating. A two-way or extrinsic rating is assigned to each project-vendor combination as well as establishing a subsidiary risk measure. The two-way rating bases the assessment of the technology vendor or the ability to execute and deliver on a particular project. While the intrinsic rating of a particular vendor might be high, the two-way rating may be low if the vendor does not have the relevant expenditure that a particular project requires. The two-way rating is a numerical ranking that addresses both the vendor to which it is assigned and a particular project under consideration. One vendor may have a relatively high two-way rating for one project, and a relatively low two-way rating for another. The intrinsic or standalone ranking is developed reacting to the vendors track record in the industry. Both these tools the 1) intrinsic rating and 2) the two-way ratings are used for the process of vendor selection. The intrinsic rating is a numerical ranking assigned to a vendor depending solely on the vendor's a-priori characteristics regardless of the project under consideration. Therefore, any vendor only has one intrinsic or standalone rating and one two-way rating for a particular project which is the vendor's ability to deliver on a specific project. The intrinsic and extrinsic rankings allow the customer to select the best vendor suited to the particular project. The ratings for both the intrinsic and the extrinsic two-way ratings are between 0 and 1 with 1 being the highest score attainable.

Furthermore, the intrinsic ranking can be modified by the customer to produce a modified intrinsic rating. The modified intrinsic rating is the rating of the vendor (as modified by the customer) based on on-going vendor performance.

Furthermore, the nominal bid submitted to a customer by a vendor is adjusted using the vendors's two-way rating providing a risk adjustment factor which incorporates both the time to delivery of the vendor and the cost per day for the vendor into its parameters to adjust the nominal bid. For a very weak vendor the risk-adjustment could be significantly high and for a strong vendor the risk-adjustment would be marginal or low.

Once a particular vendor is chosen utilizing the criteria of the present invention, the probability that the vendor would default on the performance of the contract as well as the premium for obtaining insurance for the performance of the contract can be established.

The present invention therefore is also directed to a system and method of obtaining operational risk insurance in the context of outsourcing technology development or technology contracts. A suitable structure is established whereby the interest of the insurance company, the customer and the primary vendor are simultaneously preserved. This vendor can be located in the United States or any country of the world.

Therefore, it is an object of the present invention to develop a system and method of partitioning a contract, such as a technology/software contract into independent modules/phases.

It is yet another object of the present invention to provide a system and method to develop a scoring/rating for each of the vendors.

It is still yet another object of the present invention to develop a matrix for comparing vendors bidding on a single contract. The matrix comprises the partitioning of the technology contract, the vendor intrinsic rating, the vendor two-way rating, the risk-adjusted bid and the insurance/guarantee premium attributable to a particular vendor risk and delivery ("the CTO matrix").

It is still another object of the present invention to develop a system for providing risk adjustments to the bids of each of the vendors.

It is still another object of the present invention to develop an algorithm for determining the price of a premium for insurance/guarantee coverage for the performance of the vendor.

Other objects and characteristics of the present invention will be made apparent from the description below and the attached drawings.

DETAILED DESCRIPTION OF THE PRESENT INVENTION

Figure 1:
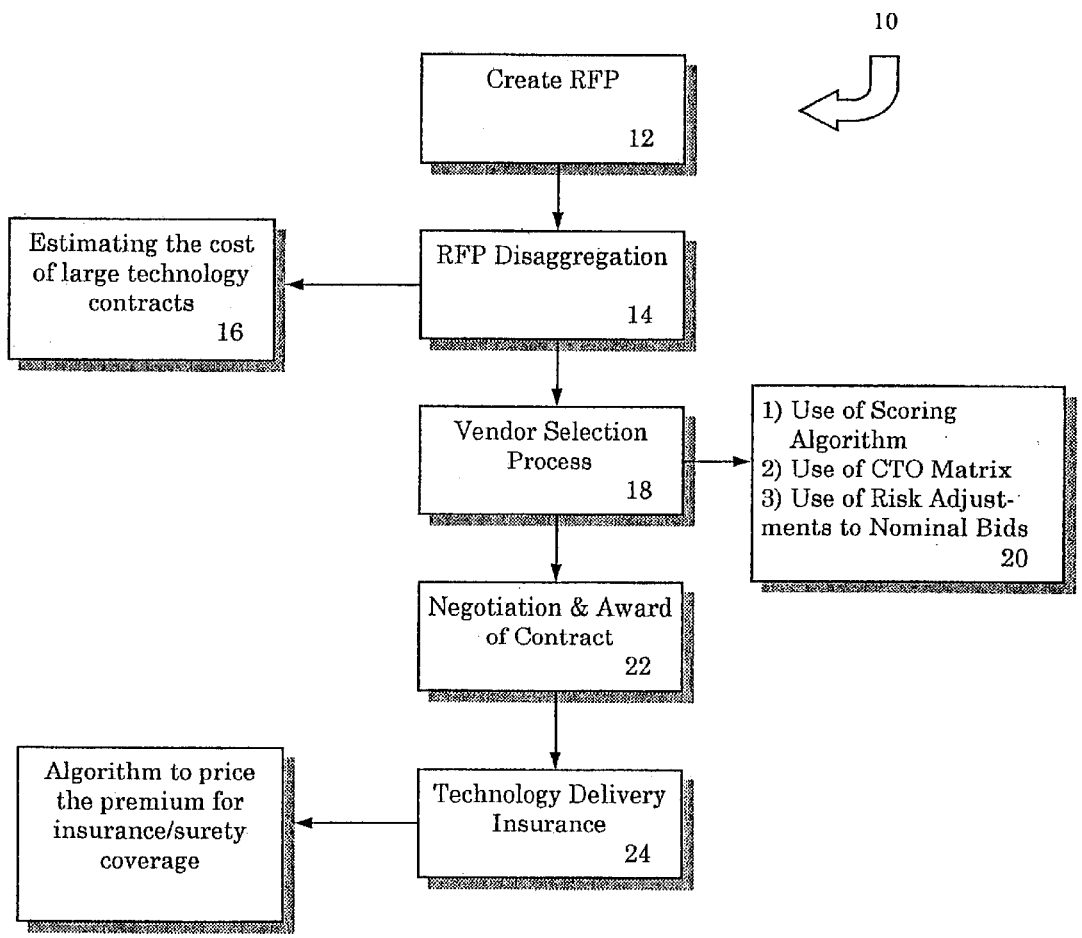
FIG. 1 is a flow diagram illustrating the generalized method of the present invention.

FIG. 1 illustrates the broad concepts of the present invention 10 in which a technology or similar IT contract is disaggregated for the process of efficient vendor selection and to establish better standards in the technology market. The commodity concept is largely misunderstood. Although most people can name commodities without much trouble, it is an artificial construct. There are no naturally occurring commodities. Even the most common substance, water, is far from uniform in properties of behavior across regions of countries. Every commodity is an artifact assigned to facilitate trading between disconnected parties. Commoditizing removes physical properties and other controllable variables from pricing discussions through standardization. For example, removing credit risk from a mortgage-backed security allows its price to be dictated solely by interest rate considerations. By doing so, liquidity, tradeability and ultimate market potential are all increased. Anything can be made into a commodity through appropriate standardization. The problem that must be solved with respect to technology contracts is to standardize, or equalize, the properties of the contract or project.

The present invention approaches the problem of commoditization of technology contracts in terms of assessment of risk. The present invention therefore develops a system and method for valuing technology contracts hence allowing vendors to put in bids which are efficient and relevant.

Once a customer determines that he wishes a contract to be bid upon, the present invention would utilize a reverse-auction pricing model based on replacing the lowest cost selection method normally used in selection of the vendor with a more meaningful lowest risk-adjusted cost concept. Once these adjustments are determined, they are made to the nominal bids provided by the vendor.

Once a request for proposal (RFP) is generated at 12, the customer would post the RFP in a secure area within a computer platform. Rather than going straight to the vendors, the RFP is further processed utilizing the expertise of the present invention. Alternatively, the customers are free to bypass this step and send the RFPs to their preferred vendors.

Once the RFP is generated, the RFP would be partitioned at step 14, regardless of size or complexity, into a series of non-overlapping work modules or a series of phases. A work module or a phase is defined as the portion of a technology contract that does not overlap with another portion. The computer platform would recognize the partitioned RFP. The disaggregation of the RFPs into independent modules or phases as inputs to the reverse auction bidding platform is one component of the present invention. Each of the vendors would be then asked to bid according to the schedule of modules or phases to estimate the costs of large technology contracts 16. The original bids that the vendors submit is known as the nominal bids. These nominal bids would be added to the computer platform in any known manner such as scanning them in or by sending the bids to the computer platform via the internet. These bids are shown for the different modules or phases in the top portion of Table I, as shown below. After the vendor is selected at step 18 utilizing various techniques at step 20 including the use of a 1) scoring algorithm (both the nominal and the two-way ratings), the use of a 2) CTO matrix and the use of 3) risk adjustments to nominal bids, the contract would be awarded at step 22. Based upon an algorithm to price the premium for insurance coverage 26, insurance coverage would be obtained at step 24. The computer platform would be provided with the appropriate software to make the proper calculations to determine the various nominal and two-way ratings. The computer platform would also have the capability to compare the nominal and two-way ratings of each of the vendors.

TABLE I

(CTO MATRIX)

| | | Client | | | |
|---|---|---|---|---|---|
| Project Name | Client X Start Date End Date | Vendor 1 Dec. 1, 2000 Jun. 30, 2001 | Vendor 2 Dec. 1, 2000 Jan. 1, 2002 | Vendor 3 Dec. 1, 2000 Apr. 30, 2001 | Vendor 4 Dec. 1, 2000 Jun. 30, 2001 |
| Execution (days) | | 209 | 720 | 149 | 209 |
| Intrinsic Rating | | 0.80 | 0.75 | 0.60 | 0.20 |
| Two-Way Rating | | 0.43 | 0.24 | 0.33 | 0.01 |
| Requirements | | $ 70,000 | $169,000 | $ 50,280 | $ 22,000 |
| Design | | $ 87,000 | $211,500 | $ 62,850 | $ 27,500 |
| Build/Unit Test | | $ 52,500 | $126,800 | $ 37,710 | $ 16,500 |
| Integration Testing | | $ 17,500 | $ 42,250 | $ 12,570 | $ 5,500 |
| System Testing | | $ 70,000 | $169,000 | $ 50,280 | $ 22,000 |
| Installation | | $ 35,000 | $ 84,500 | $ 25,140 | $ 11,000 |
| Support | | $ 17,500 | $ 42,250 | $ 12,570 | $ 5,500 |
| Nominal Bid | | $349,500 | $845,000 | $251,400 | $ 110,000 |
| Risk-Adjusted Bid | | $689,578 | $845,000 | $726,227 | $1,193,713 |
| Insurance/Guarantee Premium | | $269,787 | $ 0 | $747,820 | $ 668,125 |

Figure 2:
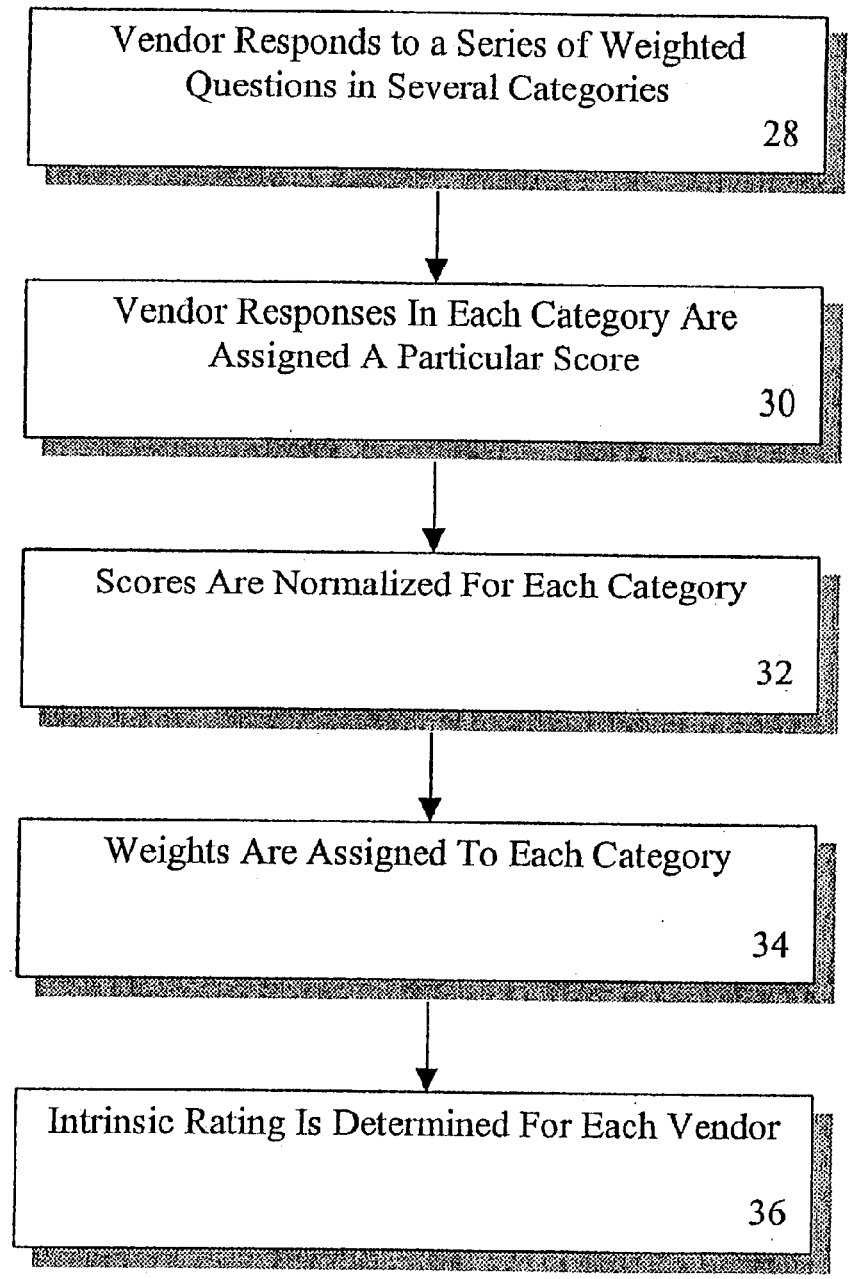
FIG. 2 is a flow diagram illustrating the calculation of the vendor's intrinsic rating.

FIG. 2 illustrates a flow diagram for adjusting the nominal bids submitted by each of the vendors for the risk inherent in selecting each of the vendors. As previously indicated with respect to FIG. 1, an RFP is generated and partitioned into the independent modules or phases. The disaggregating of the contract into its constituent parts allows vendors to bid on components of the RFP. As indicated in FIG. 1, the disaggregation of the contract into component sections as well as the use of other algorithms would be utilized in the vendor selection process at step 18. These selection criteria shown at step 20 would include the use of a scoring algorithm, the use of a CTO matrix as well as the use of risk adjustment to nominal bids. These algorithms would be provided on the computer platform.

The vendor will be rated in several manners including an intrinsic standalone rating of the vendor, as well as a two-way extrinsic rating of the vendor and finally a modified intrinsic rating of the vendor which is based on feedback from the customer and on-going performance of a vendor. These ratings would be calculated on the computer platform. The intrinsic rating and the modified intrinsic rating are used to rate the vendors's history based upon the vendor's answers to a number of inquiries as well as the customer's experience utilizing the vendor. The two-way rating is determined relative to the project under proposal and is relative to the other vendors bidding on that particular proposal. Both the intrinsic and extrinsic ratings of each vendor is shown in Table I. The manner in which these ratings are determined will be described hereinbelow.

The intrinsic and modified intrinsic ratings would generally be used by the client to narrow the number of vendors to which a particular bid would be submitted. It will generally not be used to rate the vendor on its ability to perform on a particular contract. Various calculations used to rate each of the vendors would be done on the computer platform.

The manner in which the intrinsic score is determined is illustrated in FIG. 2. Each of the vendors is provided with a series of questions included in several categories at step 28. For the purpose of the algorithm described in the present invention, these categories include general and corporate information; market segmentation; client base; software development proficiency; operational procedures and work force augmentation. However, it should be noted that based upon the type of vendors involved in the bidding process as well as the project to be bid, these categories can be altered. Within each of these categories are several other detailed inquiries and questions that are included. The general and corporate information include information relating to the size of the corporation as well as the percentage of management people and the percentage of sales in various regions of the world. Market segmentation is generally directed to the types and size of projects as well as the growth of the vendor's revenue.

The client base questions are directed to the percentage of the firm's recent revenue in particular domains to gauge in which segment this vendor is most significantly active as well as discussions on the number of clients which the technology vendor currently/in the past has serviced. If the contracts are directed to IT field, questions relating to software development proficiency would be included. These questions normally relate to the proficiency of the vendor and the development of technology. Operational procedures generally relate to the amount in which the vendor operates such as whether a quality assurance program is in place. Questions relating to work force augmentation would be directed to the technology vendors who regularly place "technology professionals" and not so much engage in bidding for actual service contracts. As can be appreciated, the number and types of questions in each of the categories can be altered for a multitude of reasons. As can be appreciated, not all of these questions in the above-noted categories are equal. Consequently, each of these questions is assigned a weighted score. Each of the vendors responses are noted and are assigned a particular score at step 30. These scores are normalized for each of the categories at step 32. The present invention would weight each of the categories at step 34 with the total weights of all of the categories summing to 100. It can be appreciated that based upon the type of project upon which a bid is offered, different categories would have more importance than other categories, and, indeed, one or more categories can be assigned a weight of 0 to account for the customer preferences. These weighted responses are entered or calculated on the computer platform.

Calculation of the Intrinsic Rating

The intrinsic rating (IR) is determined at step 36 utilizing equation (1).

$$IR = \Sigma W_i * X_i \quad (1)$$

where $W_i$ = Weight for category i
$X_i$ = Normalized score for category i

The intrinsic rating is determined after normalizing each category with the normalization factor being the highest score for that particular category. The final weights are multiplied with the normalized scores to determine the final intrinsic rating for each vendor. This rating would be scored from 0 to 1 with 1 being the highest attainable score. All of these steps are accomplished on the computer platform.

Figure 3:
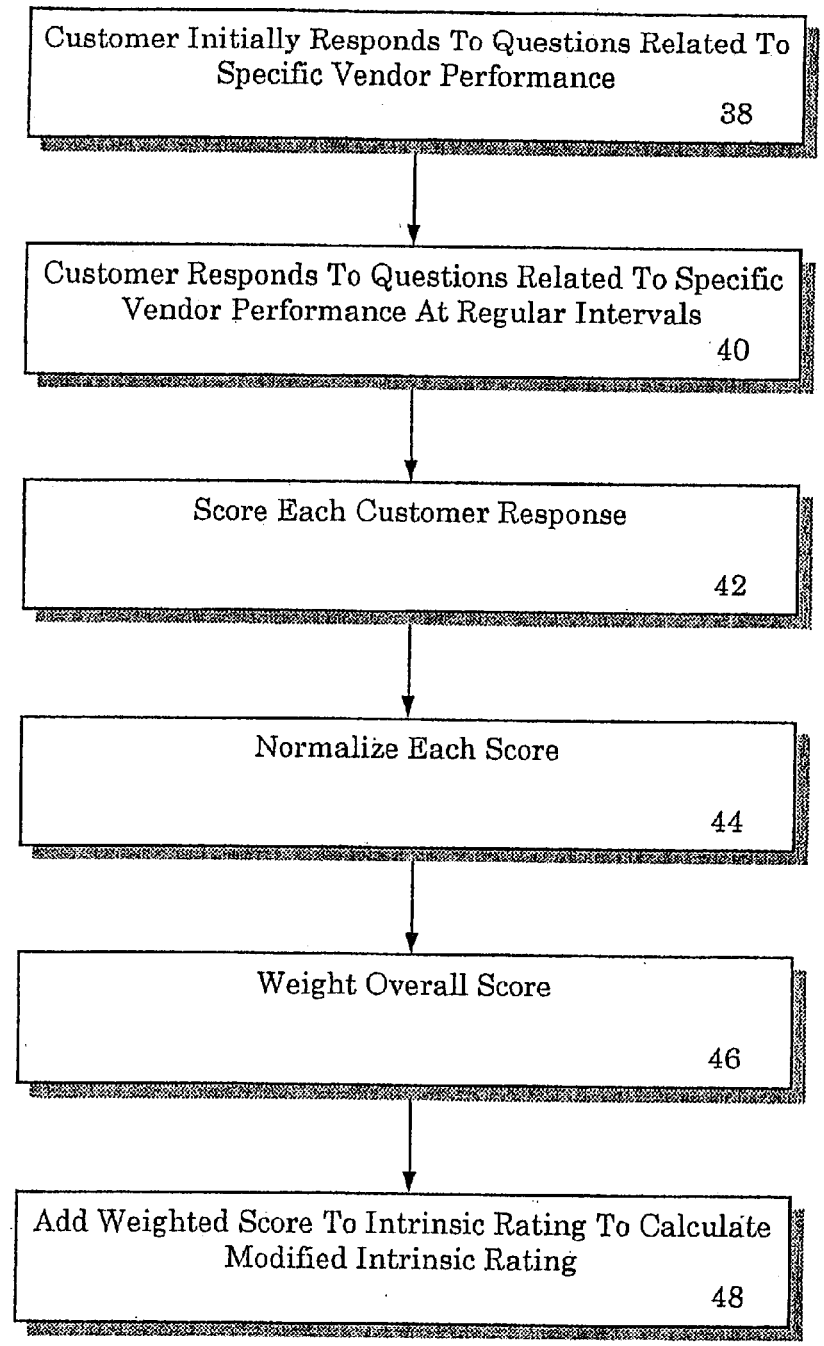
FIG. 3 is a flow diagram illustrating the calculation of the vendor's modified intrinsic rating.

FIG. 3 illustrates a procedure for allowing the customer to modify the intrinsic rating (IR) of each vendor based upon vendor performance. Various questions are initially given to the customer for responses thereto relating to the specific performance at step 38. The customer is also given an opportunity to answer the same questions as included in step 38 or additional questions related to the specific vendor performance at regular intervals at step 40. The answer to these questions are scored at step 42 and normalized at step 44. Based upon the algorithm of the present invention for customer preferences, both the IR score as well as the modified IR score are weighted in a manner to reflect the relative importance of these scores. If it is judged that the IR score is more important than each customer's view of the particular vendor, the IR score would be more heavily weighted. When this value as described in FIG. 3 is added to the IR score, weighted according to preferences, the modified intrinsic score is calculated. The modified IR score would range between 0 and 1 with 1 being the highest rating, and would be included on the computer platform.

Calculation of the Two-Way Rating

To properly compare each of the vendors and to determine the risk-adjusted bid, a two-way vendor rating (VR) must be calculated as described hereinbelow and illustrated with respect to FIG. 4. This two-way rating is a modified implementation of Bayes' theorem whereby the intrinsic rating is the "a priori" probability and a two-way rating is the "a posteriori" probability. The two-way rating adjustment uses project specific characteristics and matches them to each vendor's stated expertise. Vendor specific information required to compute the two-way rating is aggregated by the present invention during the vendor pre-certification stage or the calculations done in the previous section (intrinsic rating) of the invention. By taking into account relevant vendor knowledge, or lack thereof, the present invention's two-way rating becomes a much finer assessment of project-specific success probability compared to previous attempts which are based on the very general assessment of vendor capabilities or various object assessments of "maturity levels", seem weak in contrast. The two-way VR is expressed in equation (2).

$$\text{Two-way } VR \text{ for } k = [Q(x, k) \times P(k)]/Q(x) \quad (2)$$

where $Q(x, k)$ is the percentage of projects of type x that vendor k has performed in the past; $P(k)$ is the intrinsic rating in a range of from 0 to 1 of each vendor as described hereinabove, and $Q(x)$ is the summation over all vendors of $Q(x, k)*P(k)$. This means that the vendor distribution has been normalized such that the set of candidate bidders makes up the entire distribution. It is noted that the two-way VR for vendors 1, 2, 3 and 4 in Table I would be 0.43, 0.24, 0.33 and 0.01, respectively. These calculations are performed on the computer platform.

Figure 4:
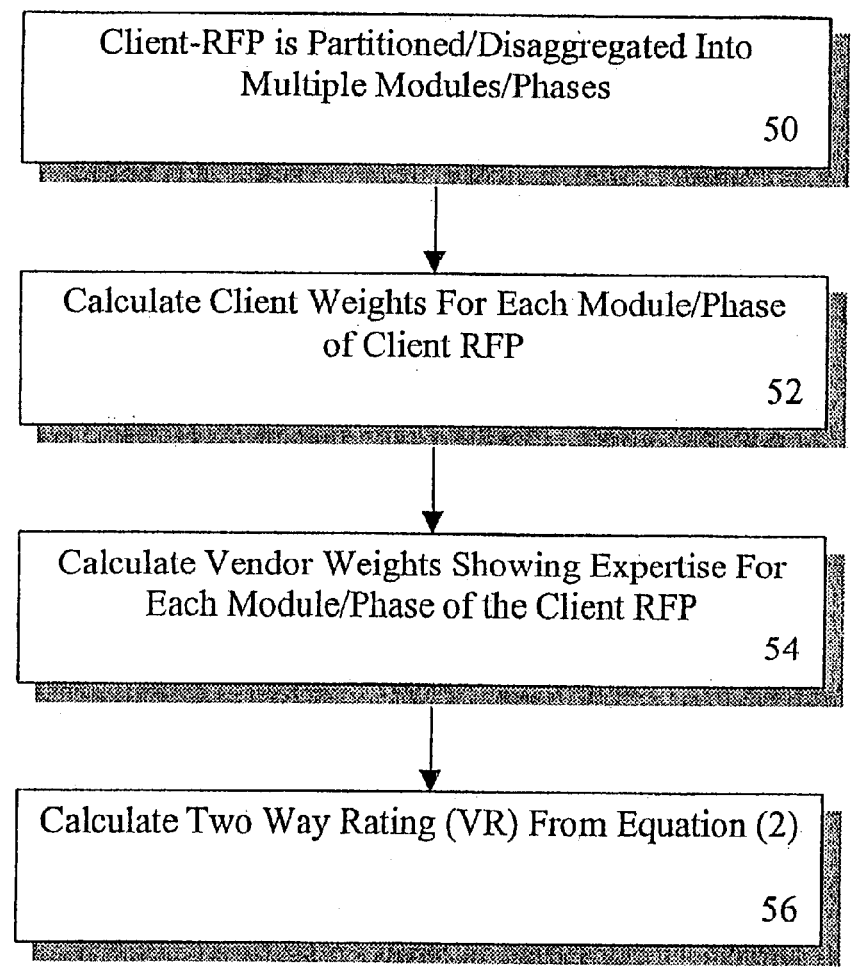
FIG. 4 is a flow diagram illustrating the calculation of the vendor's two-way rating.

Referring to FIG. 4, the present invention takes advantage of the ability to partition a large contract into multiple stages or phases as shown in step 50. Since some of the modules or phases are more important than other stages or phases, the vendor's two-way rating would reflect this fact. Therefore, the client would weight each of the stages or phases of the RFP with respect to their importance at step 52. The vendor weights are then calculated showing the expertise for each module or phase of the RFP at step 54. This step would result in the calculation of $Q(x, k)$. Once $Q(x, k)$, $P(k)$ and $Q(x)$ are determined, the two-way vendor rating VR is determined at step 56. It is noted that $P(k)$ can either be the intrinsic rating or the modified intrinsic rating as described hereinabove. These calculations are performed on the computer platform.

Calculation of the Risk-Adjusted Bid

Once two-way VR is determined, it is utilized to calculate an adjustment value to be added to the nominal bid to provide the risk-adjusted bid shown in the penultimate line in Table I for each of the four vendors. Equation (3) is utilized to make this computation.

$$(1 - \text{Two-way } VR) \log_e(\mu) * \sigma_A^{BID} * C_A \quad (3)$$

i.e. [1 Two-way Vendor Rating*$\log_e$(Average Execution Time for the project)*(Conditional Variance for Vendor A)*(Vendor Daily Cost Index)]

The adjustment is based on the following data:
N = Number of Vendors Bidding for the module or the project
$C_A$ = Vendor Daily Cost Index = Project Nominal Bid/Project Execution Time (Modified Average Daily Cost)
$C^{BID}$ = Vendor Bid/Vendor Average Daily Cost
$C_A^{BID}$ = Vendor Bid/Vendor Average Daily Cost
$\mu$ = Average of execution times of all Vendors
$\mu = 1/N \Sigma C_I^{BID}$ (Summed over all Vectors i∈N)
($\mu$ is the average time of execution of all Vendor bids on the project)
Conditional Variance for Vendor A of exceeding the average time = $(\sigma_A^{BID})^2 = 1/N \Sigma \{(C_I^{BID} - C_A^{BID})^{+2}\}$ (Summed over all Vendors i∈N)
where we have the convention
$(C_I^{BID} - \mu) += C_I^{BID} - \mu$ if $C_I^{BID} - \mu > 0 = 0$ otherwise Utilizing this formula along with the information included in Table I, the conditional variance for vendors 1, 2, 3 and 4 would be 255.5; 0; 288.63 and 255.5, respectfully. When plugged into the formula for the risk adjustment, the added risk adjustment for vendors 1, 2, 3 and 4 would be 340,078; 0; 474,827 and 1,083,713. When added to the nominal bid, the total adjusted bid for vendors 1, 2, 3 and 4 would be 689,578; 845,300; 726,227 and 1,193,713, respectfully. These figures are shown in the penultimate line of Table I. Therefore, a review of Table I would indicate that while vendor 4 proposed the lowest nominal bid, when this bid was adjusted, the total risk-adjusted bid was much greater than the amount for vendor 1 whose nominal bid was more than three times greater than vendor 4's nominal bid (note that the ratings, both the intrinsic and two-way ratings for vendor 1 are much higher). Thus allowing the customer to analyze that even though vendor 4 bid was the low4st there was significant risk involved in selecting this vendor. The client would review the risk-adjusted bids utilizing the information included in Table I to reach a decision and select a vendor. The client would use both the nominal and risk-adjusted bids since various vendors have flexibility in different areas, and local knowledge may be critical in determining the optimal combination. These calculations are performed on the computer platform.

The client may wish to go through a second round of bidding. If this is the case, an updated RFP is completed and is sent out with slightly different parameters and requirements. This might occur since the client will have learned to refine their requirements after the initial bidding round and will more accurately represent the client's needs during this second round of bidding. If this is not exercised, the client would select the ultimate vendor.

The system of the present invention would include bidding instructions, one of which is to respond to breaking out the proposal into the same modules or phases and for vendors to respond with a dollar and time bid for each one. Additionally, since time of delivery of each module/phase is important, each of the vendors would also supply the particular time of delivery for each of the modules or phases as well as a total time to complete the entire project. The nominal dollar bid from each vendor would be adjusted to compensate for the risk associated with weaker vendors. This adjustment would be proportional to the risk involved in dealing with that particular vendor. Weak vendors will experience high adjustments, while strong vendors will experience low adjustments. Using this risk adjustment method, the present invention will adjust the nominal amount of each bid to establish the risk-adjusted cost of the contract when delivered by a particular vendor, allowing the customer a much better assessment of the nominal bid and the risk inherent in the selection of a particular vendor. This risk adjustment would be included along with information relating to each of the modules or phases of the bid in a CTO decision matrix as shown in Table I, and would be accomplished on the computer platform.

The CTO decision matrix is a basic summary report that enables a quick and substantive review of the bids received from the vendors on any RFP. In addition to the intrinsic and extrinsic two-way vendors rating and total execution time for the project, the matrix shows a time allocation for each phase of the project and the price charged by each vendor for each phase. The third line of the matrix shows the total execution time for the contract. It is noted that the third to the last line of Table I would include the nominal bid of each of the vendors and the penultimate line would include the risk-adjusted bid based upon a method which will be explained in detail. The risk-adjusted bids are computed on the computer platform using client-defined preferences with respect to cost verses time, project parameters and the vendor-two-way ratings. In general, a weak vendor will have a much higher upward adjustment than a strongly rated vendor. The two-way rating shown in line four of Table I address the suitability of using a specific vendor on a particular project and incorporates relevant experience and prior history on similar projects. This process would yield a uniform scale through which all vendors can be compared. Line 13 of Table I includes the estimated cost of pricing delivery risk insurance on this project by the vendor. The manner in which this delivery risk insurance is calculated will be described below.

As described hereinabove, one aspect of the present invention was to develop a system and methodology that customers could use for rating and assessing the risk inherent in determining a particular vendor to utilize to perform a particular technological contract. The present invention developed the use of intrinsic as well as two-way extrinsic ratings used to compare the bids promulgated by various vendors. The present invention also developed a methodology of structuring an insurance contract allowing customers to be able to hedge their risk of using various technology vendors. The result of the structure and method is to reduce the shareholder risk to technology and vendor delivery for large corporations and to allow the outsourcing of technological projects to on-shore and off-shore vendors. This would considerably reduce the risk of outsourcing technology contracts.

The present invention addresses the offering of operational risk insurance/surety for outsourcing services, both within the United States and overseas; notably to India, China, Philippines, Israel or the Russian Republic. These countries possess equivalent intellectual expertise to United States vendors, but at lower costs. Many companies based in the West would hesitate to outsource technology projects because of the perceived risk of various vendors located in geographically remote areas both overseas and within the U.S. of living up to their obligations under the particular technology contract. This is partly due to lack of knowledge of the various technology vendors in this area as well as lack of standardized objective criteria through which these overseas technology companies can be analyzed, rated and assessed.

Large corporations often live and die by the promptness with which their technology is delivered. Core-business could suffer significantly if technology is either not delivered or not delivered on time. The mitigation of the economic consequences of such delays, and the associated protection of the stock price for the large corporations is of paramount importance. Therefore, to provide insurance against such contingencies, one must first establish an unambiguous method to assess the delay and then to construct an insurance/guarantee contract under which the policy will compensate the customer against the vendor who has defaulted. Therefore, it is important to define "default" so that its occurrence would trigger payment by the insurance company or guarantor to the customer.

Consequently, the present invention would allow large companies to "insure" vendor delivery for both domestic as well as overseas vendors. This would allow these companies to mitigate risk of doing business with unknown vendors based both in the United States and in foreign countries. It would also enable the companies to test vendors who would otherwise would not be part of the selection pool but might exhibit skills which would be particularly applicable to a specific technology contract. The present invention would also create better relationships between the customer and proprietary vendors, thereby giving the customers more options and a higher comfort factor—using this structure they are for the first time protected against a vendor's non-delivery.

To determine the insurance premium, a number of factors must be analyzed to price the risk that a particular vendor would not timely deliver the product in a timely manner. This would include the net exposure of an insurer following a claim lodged by the customer, the conditions upon which a claim on the policy can be made, the basis of risk estimation based upon the number of modules/phases in the contract and the probability of a default occurring at any point in time.

The present invention contemplates that a default would be declared and a claim made when a vendor fails to complete any stage within a pre-set limit, known as the trigger value for that stage. Trigger values are computed as multiples of the cumulative time a vendor is expected to complete the series of stages leading up to any subsequent stage. Since all stages are contiguous and non-overlapping, the expected duration is simply equal to the vendor's cumulative time provided in the bid submitted to the client. These trigger values are included on the computer platform.

For example, a trigger value of 2.0 is defined as twice the amount of time the vendor estimated that a particular stage of the contract would be completed. Therefore, if the vendor in question specifies that stage one will be completed within 20 days, a default will be declared if stage one is still not completed after 40 days. Completion is defined formally by the fact that each stage is associated with a specific deliverables. If the client accepts the deliverable and signs off on it, the corresponding stage is deemed to be complete.

The key to premium calculation lies in the derivation of the required probability distributions allowing the default probabilities to be computed at each phase or stage.

The trigger is the value of the delay probability where there is sufficient certainty of a delay that a default can be declared under the policy. The default itself is not a probability. Either there is a default or there is not a default. But the trigger is defined by the value of a probability and therefore is a number between 0 and 1. Technically, the vendor could always wait until the day of delivery where the delay probability may become 1 to declare default under the policy.

Figure 5:
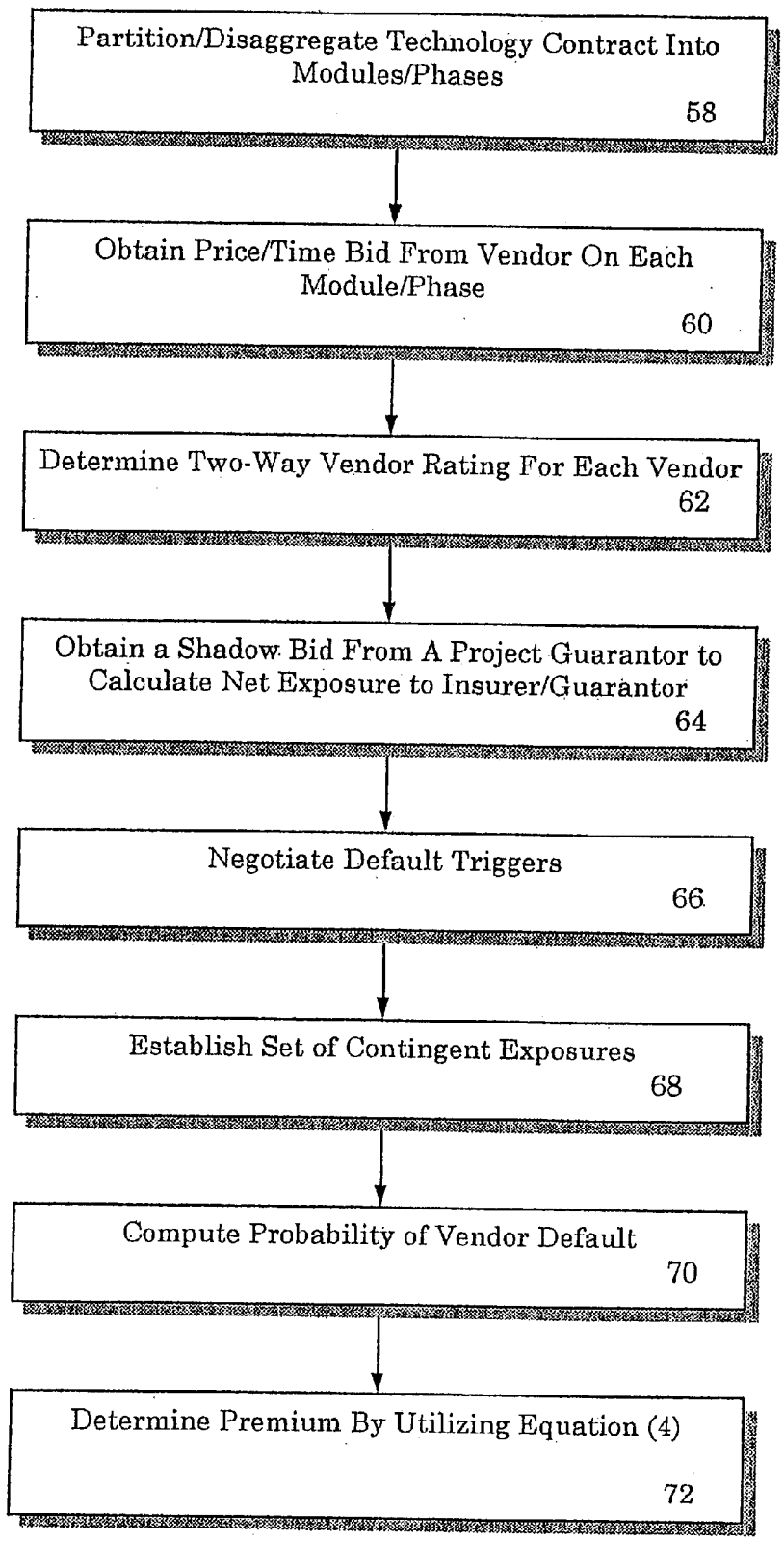
FIG. 5 is a flow diagram illustrating the calculation which adjusts the vendor's nominal bid for a project into a risk-adjusted bid.

Referring to FIG. 5, we will now describe the methodology of determining a premium price to be charged for delivery by a particular vendor. The vendor could be located both onshore and offshore. Similar to FIG. 4, the technology contract is partitioned into a number of modules or phases at step 58. Therefore, once the contract is initiated, the contractual work can be monitored in terms of the number of phases/modules that have been completed. At each prescribed time interval, the vendor's phase completed can be compared to expected completion dates to determine the statistical estimate of the probability of not meeting the delivery date. This can be accomplished using the computer platform. Late delivery of the phases/modules will result in delays of the overall project unless the future phases can be completed in less than their scheduled time. The original schedule has been set up and monitored against vendor's actual deliver of phases/modules. This schedule is entered on the computer platform, directly by using the internet with the vendor's indirect contact with the computer platform. Alternatively, the bids can be scanned into the computer platform or entered by any of the known methods. As the project progresses, the delay probability would either increase towards 1 if it would appear that the contract is being completed on a timely basis or would decrease towards 0 if the contract has been delayed. Once the contract has been partitioned, a price/time bid is obtained from each vendor on each module/phase at step 60. Utilizing the methodology described hereinabove, the two-way vendor ratings are determined using the computer platform and then used for each of the vendors at step 62. At this point, a shadow bid is obtained from a secondary vendor or project guarantor to calculate the net exposure to the insurer/guarantor at step 64. The shadow bid from a secondary vendor or project guarantor is the price a well established technology company would charge to step into the defaulting vendor and taking over the task of completing the project. Once this is accomplished, default triggers are negotiated at step 66. This negotiation would be done between the customer and the insurance/guarantor company. At this point, a discount rate R is also determined. For sake of argument, we can assume a risk-free rate of 7%.

Once this is accomplished, various contingency exposures must be determined at step 68. These contingency exposures could include various risk factors such as whether the company is United States based or based in a foreign country having an unstable political climate or economy. Various other demographic or economic factors could also be utilized to determine the contingent exposures.

Step 70 computes using the computer platform the probability a particular vendor will actually default at a particular module or phase. For each stage the default probability of a vendor is computed by computing the probability distribution of the cumulative completion times that the vendor has bid. From this distribution we estimate the probability to the right of the default trigger (that has been previously established) and that number is the default probability at that stage. We assume that the individual stage completion time distributions are normal with the mean given by the vendor bid and the standard deviation given by the conditional standard deviation attached to the vendor in a particular vendor set. We use both conditional and unconditional probabilities of default in different scenarios for calculating the insurance/guarantor premium. The default probability $P_i$ is hence determined at step 70. The premium at step 78 is calculated by multiplying the sum of exposures by the default probability as shown by equation (4). The calculation is made for each module/phase.

$$\text{PremiumAmount} = (1 - VR) * \Sigma P_i * E_i / (1+R)^{t(i)} \quad (4)$$

where

VR=vendor two-way rating $P_i$=the probability that the vendor will default after completing module "i";

$E_i$=the net exposure of the insurer after completing module "i";

R=suitable discount rate; and t(i)=module "i" completion time when the trigger is breached at that time.

TABLE II

| Phase 1 | $252,947 |
|---|---|
| Phase 2 | $121,245 |
| Phase 3 | $54,923 |
| Phase 4 | $21,362 |
| Phase 5 | $18,665 |
| Phase 6 | $5,782 |
| Phase 7 | $1,722 |
| TOTAL | $476,646 |

The summation portion of this equation is the sum of exposures for each of the phases of the project as shown in Table I. Table II includes the exposure for each of the seven phases including the sum of exposures, in this case being $476,646. Table II details the sum of exposures for vendor 1 in Table I. Since the two-way VR for vendor 1 is 0.434, when 1-0.434 is multiplied by the sum of exposures $476,646, an insurance premium of $269,787 is calculated. The insurance premium for vendors 3 and 4 were calculated in a similar manner. It is noted that since vendor 2 was outlier, no insurance premium could be calculated. The dollar value of each of the exposures decreases from phase 1 through phase 7. This results from the fact that the exposure decreases from phase 1 through phase 7 since it is assumed that once one of the later phases is reached (such as phase 5), the first four phases of the contract were completed in a timely manner, resulting in a reduction of risk for the insurer.

Figure 6:
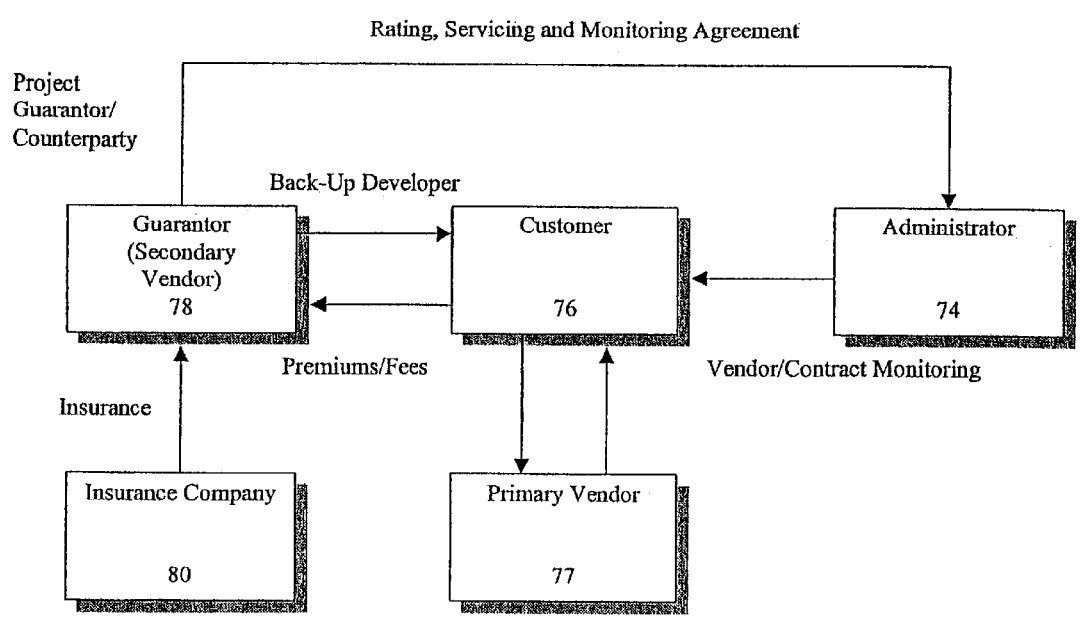
FIG. 6 is a flow diagram that shows the overview of the insurance/guarantee algorithm.

The overview of the present invention relating to the arrangement between various parties of the structure of the contract is shown in FIG. 6. The administrator 74 who provides on-going vendor ratings and monitoring of the contract using the computer platform is the backbone of the present invention. The administrator would either alone, or with the assistance of the customer 76 partition a bid into a plurality of phases/modules. The administrator 74 would also obtain responses from the various vendors 77 regarding their past performances in general or specific to the particular technology contract to calculate the intrinsic rating (IR) as well as the two-way extrinsic rating (VR) on the computer platform. The administrator would be on-going rating agency which monitors vendor ratings and the technology service contracts. It is noted that the intrinsic rating can be modified with the help of the customer 76. Based upon these factors, as well as the additional steps shown in FIG. 5, an insurance premium or a guarantor's fee is determined for each of the vendors for a particular technology contract. The guarantor (or the secondary vendor) 78 would also provide the shadow bid which we use to determine the net exposure to the insurance company 80. The insurance company determines the premium for the risk of underwriting the technology risk. This can be done directly or through an insurance broker. It is noted that the administrator 74 can assist with the determination of the premium using the computer platform.

Figure 7:
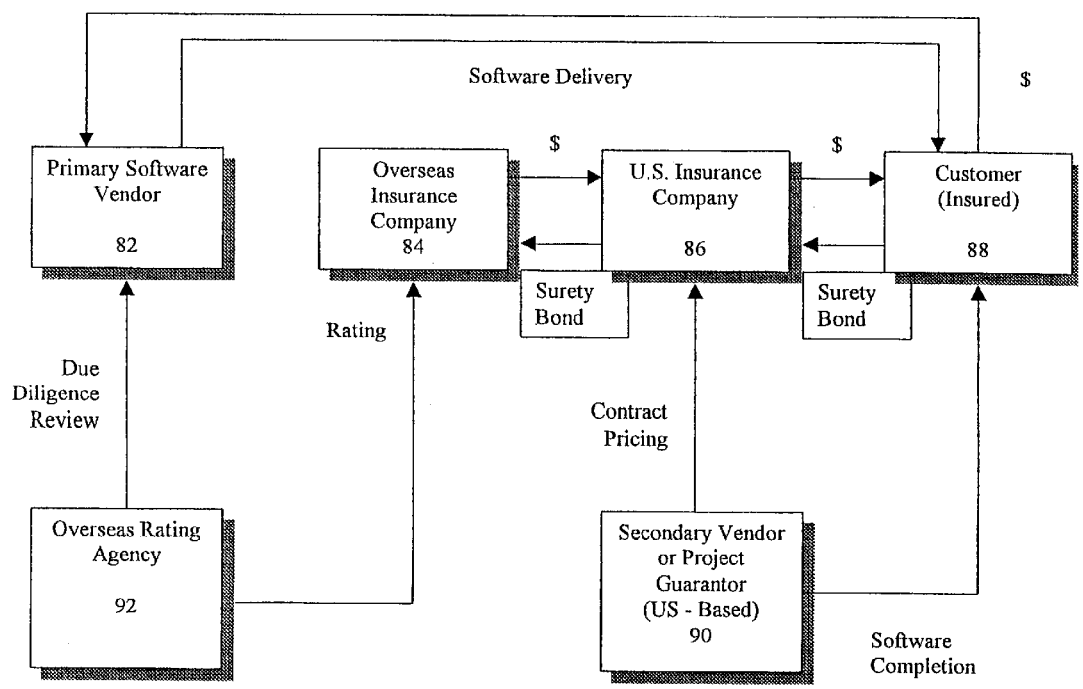
FIG. 7 shows the methodology to calculate the risk premiums for the technology insurance/guarantee contract.

Although the determination of the premium is not altered by the nationality of the vendor, different risks might be assumed in this type of situation. This scenario is illustrated with respect to FIG. 7. In this instance, customer 80 wishes to have software developed by a vendor 82 situated in a foreign country. The customer 84 would then contact a United States insurance company 86 who in turn would issue an operational risk policy protecting customer 88 according to the terms of the project. The U.S. insurer 86 would contact an overseas insurance company 84 to re-insure a portion of the risk and would therefore receive a portion of the revenue. The overseas insurer would do due diligence review on the overseas software vendor 82 and may hire a third party 92 to provide a vendor risk rating to assess its own risk. The overseas insurer 84 provides the "first loss" piece while the customer only deals with the U.S. insurer 86. If the project is declared in default according to the terms of the policy, a U.S. based secondary vendor/guarantor 90 would take over responsibility for the project and see to its completion. All of the additional costs would be paid by the U.S. insurer 86. The reason for this mechanism is to create an initial comfort level in the mind of the U.S. based customer unfamiliar with outsourcing as a viable alternative in in-house development.

The overseas insurance company 84 would underwrite the local risk and establish formal parameters under which they would take on a negotiated portion of the operational risk related to completion of the project. The overseas rating agency 92 would conduct a due diligence review of the perspective software vendor 82, after which a rating would be issued. Armed with this rating, the overseas insurance company 84 would underwrite the project and provide the U.S. insurance company 86 with a "first loss" protection layer in the form of a surety bond. The latter would then "wrap" the foreign based reinsurer with a secondary performance bond by and between itself and the U.S. customer. Before the U.S. insurer could be called upon to pay on a default claim, the primary policy would have to be fully drawn. The U.S. customers would be relying solely on the secondary policy.

In order to execute such a program, and to price the risk assuming a risk-adverse counter party, it is important to define the net exposure of the U.S. based insurer following a claim, the conditions upon which a claim on the policy can be made, the basis for risk estimation and, the probabilities of default occurring at any point in time.

Risk neutral valuation must be accomplished under objective conditions if fair pricing is to ensure. This is because the cost of the policy to United States based customers must still result in net cost savings over comparable onshore developing costs despite risk-aversion by the insurer. Final pricing will, as always, will be left up to bilateral negotiation between the U.S. based insurer and the customer.

The policy is intended to deliver the required comfort level to U.S. based clients. This can be accomplished by contracting substantial a U.S. based software firm as a secondary vendor or a guarantor of the project. In order for this method to work, the secondary vendor or the guarantor of the project (who provides the shadow bid) must be kept "in the loop" in some nominal fashion during the project's final negotiation stage in order to have them price their services for the project if the winning vendor were to default on contract delivery. The secondary vendor or the guarantor would be paid a fee for costing out the project and for providing project management. Alternatively, the present invention would contract with these firms on a global basis and negotiate certain preferential terms owing to this special relationship. The net exposure to the United States based issuer is the difference between the shadow bid and the vendor's bid.

In the event of a default, the exposure of the insurance company is defined as the difference between the secondary vendor's (or the guarantor's) firm bid and the primary vendor's bid of the portion of the project that remains outstanding after default. This is because the U.S. based client is then assured of seeing this project completed for the amount originally budgeted, albeit with some potential time delay. When appropriate, the definition can be easily extended to include an adjustment for this delay. An alternative structure would have the exposure calculated as the difference between the primary vendor's bid and that of another "primary" vendor. However, it is highly unlikely that a U.S. based customer having just been defaulted by an offshore software vendor would seriously consider entrusting the project completion to another offshore vendor.

Therefore, the value of the relevant set of contingent exposures can be quantified exactly at project inception. In order to price policies however, we would still need to determine the associated probabilities with which such contingent exposures would become liabilities of the insurer in a given project. These contingency exposures are determined utilizing the function point analysis, the default definition and the default probability estimates as previously described.

Although the invention has been described in terms of the preferred embodiments disclosed herein, those skilled in the art will appreciate many modifications which may be made without departing from the true spirit and scope of the invention. For example, although the present invention discusses a situation for providing a technology contract, the present invention also is applicable to any contract capable of being partitioned. Additionally, once all of the relevant calculations are made with respect to the intrinsic and extrinsic two-way ratings as well as other distribution and normalization data, the adjusted bid as well as the premium are calculated using specially designed software for this purpose. All such modifications are intended to be included within the scope of the claims appended hereto.

What is claimed is:

1. A method for determining an insurance premium paid to an insurer from a customer for a technology contract utilizing a computer platform, comprising the steps of:

obtaining a price/time bid from a plurality of vendors for the performance of the contract;

calculating on the computer platform an intrinsic rating P(k) for each of the vendors based upon the strength and performance of each of the vendors;

calculating of the computer platform a component Q(x, k) for each vendor which quantifies the ability/suitability of a vendor to deliver on a "specific" component of said technology contract or a Request For Proposal (RFP) based on the vendor's past performance;

calculating on the computer platform a component Q(x) which is the summation of the Q(x, k) and P(k);

determining on the computer platform an extrinsic two-way rating Vendor Rating (VR) of each of the plurality of vendors using the equation:

$$\text{Two-way } VR=[Q(x, k) \times P(k)]/Q(x)$$

determining on the computer platform a default probability value $P_1$ for each of the vendors;

determining on the computer platform a first net exposure $E_i$ for said insurer;

determining a discount rate R; and calculating on the computer platform a premium paid to said insurer for each of the vendors utilizing the equation:

$$\text{Premium Amount}=(1-\text{Two-way } VR)^{*}\Sigma P_i {}^{*}E_i/(1+R)^{t(i)}$$

2. The method in accordance with claim 1, further including the steps of:

partitioning the technology contract into independent modules/phases;

obtaining said price/time bid from each of the vendors for said independent modules/phases of the contract; and determining a second net exposure based upon the completion of each of said independent modules/phases.

3. The method in accordance with claim 2, further including the step of negotiating a default trigger value for the contract.

4. The method in accordance with claim 1, further including the step of altering each of said intrinsic ratings based upon customer preference resulting in a modified intrinsic rating.

5. A system for determining an insurance premium paid to an insurer from a customer for a technology contract, utilizing a computer platform comprising:

means for obtaining price/time bids from a plurality of vendors for the performance of the contract;

means for calculating an intrinsic rating P(k) for each of the vendors based upon the strength and performance of each of the vendors on a computer platform;

means for calculating a component Q(x, k) for each vendor which quantifies the ability/suitability of a vendor to deliver on a "specific" component of said technology contract or a Request For Proposal (RET) based on the vendor's past performance on said computer platform;

means for calculating a component Q(x) which is the summation of the Q(x, k) and P(k) on said computer platform;

means for determining on said computer platform an extrinsic two-way rating Vendor Rating (VR) of each of the plurality of vendors using the equation:

$$\text{Two-way } VR=[Q(x, k) \times P(k)]/Q(x)$$

means for determining on said computer platform a default probability $P_i$ for each of the vendors;

means for determining on said computer platform the net exposure $E_i$ for an insurer; and means for calculating on said computer platform a premium paid to the insurer for each of the vendors utilizing the equation:

$$\text{Premium Amount}=(1-\text{Two-way } VR)^{*}\Sigma P_i {}^{*}E_i/(1+R)^{t(i)}$$

6. The system in accordance with claim 5, further including a means for partitioning the technology contract into independent modules/phases and receiving price/time bids from each of the vendors for each of said modules/phases and further including a means for determining the net exposure based upon the completion of each of said modules/phases.

7. The system in accordance with claim 5, wherein said means for determining said two-way rating for each vendor uses data relating to the intrinsic rating of each of the vendors based upon the general performance of the vendors as well as the specific past performance related to the vendors exposure in the particular technology.

8. The system in accordance with claim 7, wherein said means for determining two-way rating for each vendor includes a normalized distribution for the past performance for the particular technology of the contract for all of the vendors, said rating for each vendor being an extrinsic two-way rating.

9. A system for providing insurance protecting a customer against the default of a vendor performing on a technology contract utilizing a computer platform, the system including an insurance company and a guarantor, the guarantor providing a shadow bid to be used to determine a net exposure to the insurance company comprising:

an administrator means partitioning the contract into a plurality of independent phases/modules, said administrator means receiving price/time bids from a plurality of vendors for each of said independent phases/modules, said administrator additionally receiving information from the plurality of vendors regarding their general past performances as well as specific past performances relating to the specific type of technology of the contract, said administrator means calculating using said computer platform an intrinsic rating (IR) based upon the general performance of each of the vendors as well as a two-way rating (VR) based upon the specific type of technology of the contract;

means for calculating an intrinsic rating P(k) for each of the vendors based upon the strength and performance of each of the vendors;

means for calculating on said computer platform a component O(x, k) for each vendor which quantifies the ability/suitability of a vendor to deliver on a "specific" component of said technology contract or a Request For Proposal (RFP) based on the vendor's past performance;

means for calculating on said computer platform a component O(x) which is the summation of the O(x, k) and P(k); and means for determining an extrinsic two-way rating Vendor Rating (VR) of each of the plurality of vendors using the equation:

$$\text{Two-way } VR=[Q(x, k) \times P(k)]/Q(x)$$

wherein a premium is determined for each of the vendors using said computer platform based upon said intrinsic rating and said two-way rating to be paid by the customer to said insurance company protecting the customer from default of the performance of the contract by a selected vendor means for calculating said premium utilizing the equation:

$$\text{Premium Amount}=(1-\text{Two-way } VR)^{*}\Sigma P_i^{*}E_i/(1+R)^{t(i)}$$

10. The system in accordance with claim 9, wherein said administrator means determines said premium.

11. A system for providing insurance protecting a domestic customer against the default of a foreign vendor performing on a technology contract utilizing a computer platform, comprising:

an administrator means partitioning the contract into a plurality of independent phases/modules, said administrator receiving price/time bids from a plurality of foreign vendors, for each of said independent phases/modules, said administrator means receiving information from the plurality of foreign vendors regarding their general past performance as well as specific past performances relating to the specific type of technology of the contract, said administrator means calculating utilizing said computer platform an intrinsic CIR) rating based upon the general performance of each of the vendors as well as a two-way rating (VR) based upon the specific type of technology of the contract;

means for calculating an intrinsic rating P(k) for each of the vendors based upon the strength and performance of each of the vendors:

means for calculating on said computer platform a component O(x, k) for each vendor which quantifies the ability/suitability of a vendor to deliver on a "specific" component of said technology contract or a Request For Proposal (RFP) based on the vendor's past performance;

means for calculating on said computer platform a component O(x) which is the summation of the O(x, k) and P(k); and means for determining an extrinsic two-way rating Vendor Rating (VR) of each of the plurality of vendors using the equation:

$$\text{Two-way } VR=[Q(x, k) \times P(k)]/Q(x)$$

wherein a premium is determined for each of the foreign vendors using said computer platform based upon said intrinsic rating and said two-way rating to be paid by the customer to said domestic insurance company protecting the customer from default of the performance of the contract by a selected foreign vendor, and further wherein a portion of risk of non-performance of the contract will be borne by said overseas insurance company utilizing the equation:

$$\text{Premium Amount}=(1-\text{Two-way } VR)^{*}\Sigma P_i^{*}E_i/(1+R)^{t(i)}$$

12. The system in accordance with claim 11, further including an overseas rating agency for assessing the capability of the selected foreign vendor for performing the contract in a timely manner.

13. The system in accordance with claim 12, wherein said administrator means determines said premium.

* * * * *